(12) United States Patent
Kaneko

(10) Patent No.: US 8,166,391 B2
(45) Date of Patent: Apr. 24, 2012

(54) TEMPLATE GENERATING APPARATUS, IMAGE LAYOUT APPARATUS, MODIFIED TEMPLATE GENERATING APPARATUS, AND PROGRAMS THEREFOR

(75) Inventor: Yasuhiko Kaneko, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 908 days.

(21) Appl. No.: 11/882,024

(22) Filed: Jul. 30, 2007

(65) Prior Publication Data

US 2008/0028298 A1 Jan. 31, 2008

(30) Foreign Application Priority Data

Jul. 31, 2006 (JP) ................................. 2006-207755

(51) Int. Cl.
*G06F 17/00* (2006.01)
(52) U.S. Cl. ........................ 715/247; 715/255
(58) Field of Classification Search .................. 715/243, 715/244, 245, 246, 247, 249, 253, 255; 345/629, 345/619
See application file for complete search history.

(56) References Cited

U.S. PATENT DOCUMENTS

| | | | | |
|---|---|---|---|---|
| 5,594,809 A | * | 1/1997 | Kopec et al. | 382/161 |
| 6,046,745 A | * | 4/2000 | Moriya et al. | 345/420 |
| 6,456,738 B1 | * | 9/2002 | Tsukasa | 382/175 |
| 6,707,950 B1 | * | 3/2004 | Burns et al. | 382/254 |
| 7,010,751 B2 | * | 3/2006 | Shneiderman | 715/232 |
| 7,454,711 B2 | * | 11/2008 | Angiulo et al. | 715/760 |
| 7,515,733 B2 | * | 4/2009 | Rhoads | 382/100 |
| 7,555,148 B1 | * | 6/2009 | Steinberg et al. | 382/118 |
| 7,596,241 B2 | * | 9/2009 | Rittscher et al. | 382/103 |
| 7,711,145 B2 | * | 5/2010 | Gallagher | 382/103 |
| 2001/0035875 A1 | * | 11/2001 | Suzuki et al. | 345/723 |
| 2001/0042083 A1 | * | 11/2001 | Saito et al. | 707/517 |
| 2001/0049624 A1 | * | 12/2001 | Uyama et al. | 705/14 |
| 2003/0051255 A1 | * | 3/2003 | Bulman et al. | 725/135 |
| 2004/0028290 A1 | * | 2/2004 | Gamble | 382/284 |
| 2005/0134939 A1 | * | 6/2005 | Ikeda et al. | 358/471 |
| 2005/0152613 A1 | * | 7/2005 | Okutsu et al. | 382/254 |
| 2006/0004866 A1 | * | 1/2006 | Lawrence et al. | 707/104.1 |
| 2006/0279555 A1 | * | 12/2006 | Ono | 345/173 |

(Continued)

FOREIGN PATENT DOCUMENTS

JP 2005-184342 A 7/2005

(Continued)

OTHER PUBLICATIONS

Xu, Huaxin, et al, "Fusion of AV Features and External Information Sources for Event Detection in Team Sports Video", Transactions on Multimedia Computing, Communications, and Applications (TOMCCAP), vol. 2, Issue 1, Feb. 2006, pp. 44-67.*

(Continued)

*Primary Examiner* — Laurie Ries
(74) *Attorney, Agent, or Firm* — Birch, Stewart, Kolasch & Birch, LLP

(57) ABSTRACT

A template that can deal with images of various scenes is generated. Image area setting means sets image areas wherein images are inserted in a layout area of a predetermined size, and template file saving means saves information on the image areas laid out in the layout area in a template file. Attribute information adding means adds attribute information representing attributes of images to be laid out in the image areas, to information on the image areas in the template file.

23 Claims, 12 Drawing Sheets

U.S. PATENT DOCUMENTS

| | | | |
|---|---|---|---|
| 2007/0050419 A1* | 3/2007 | Weyl et al. | 707/200 |
| 2007/0157087 A1* | 7/2007 | Foerg et al. | 715/700 |
| 2007/0180375 A1* | 8/2007 | Gittelman et al. | 715/700 |
| 2007/0182829 A1* | 8/2007 | Zacks et al. | 348/222.1 |
| 2008/0089590 A1* | 4/2008 | Isomura et al. | 382/217 |

FOREIGN PATENT DOCUMENTS

| | | | |
|---|---|---|---|
| JP | 2005-309833 A | 11/2005 | |

OTHER PUBLICATIONS

Chinese Office Action issued in co-pending Chinese application No. 200710129891.0 dated Mar. 23, 2011.

Chinese Office Action issued in co-pending Chinese application No. 200710129891.0 on Jan. 30, 2012.

* cited by examiner

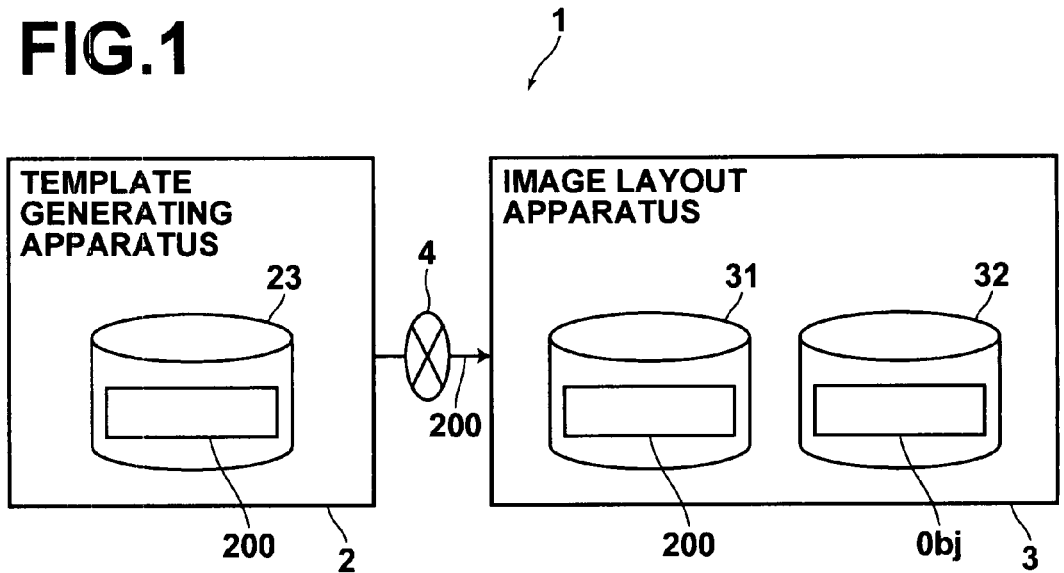
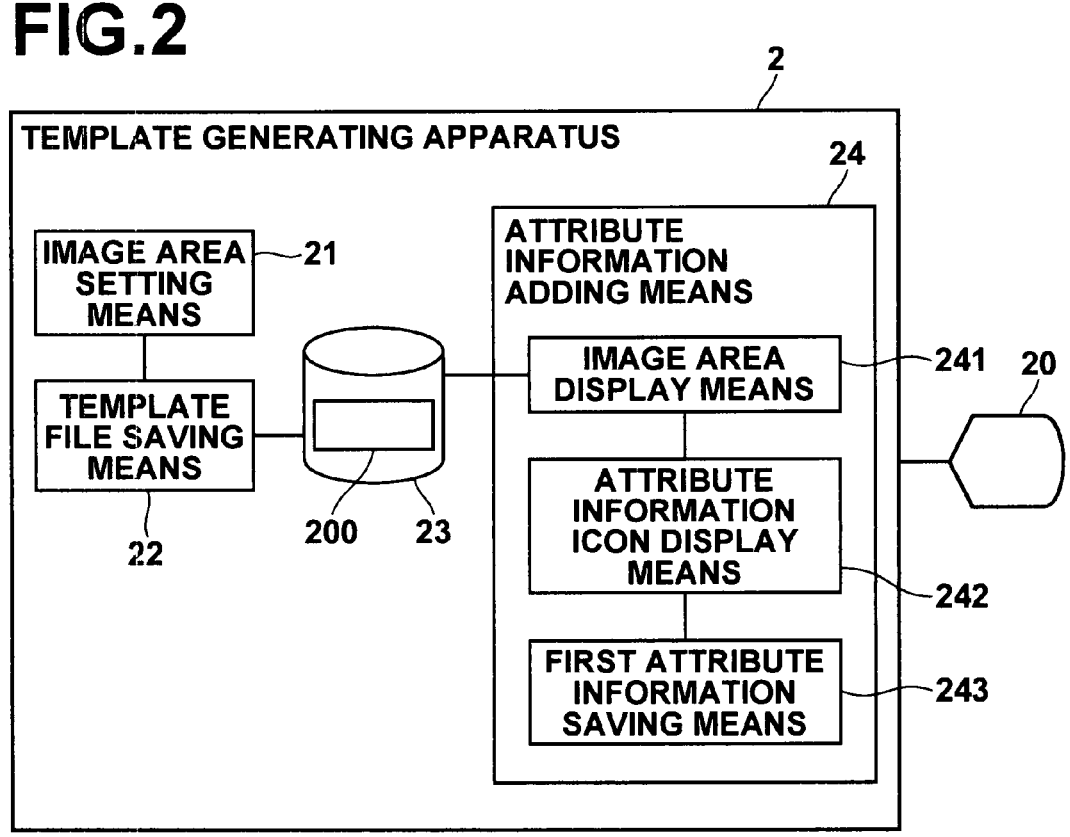

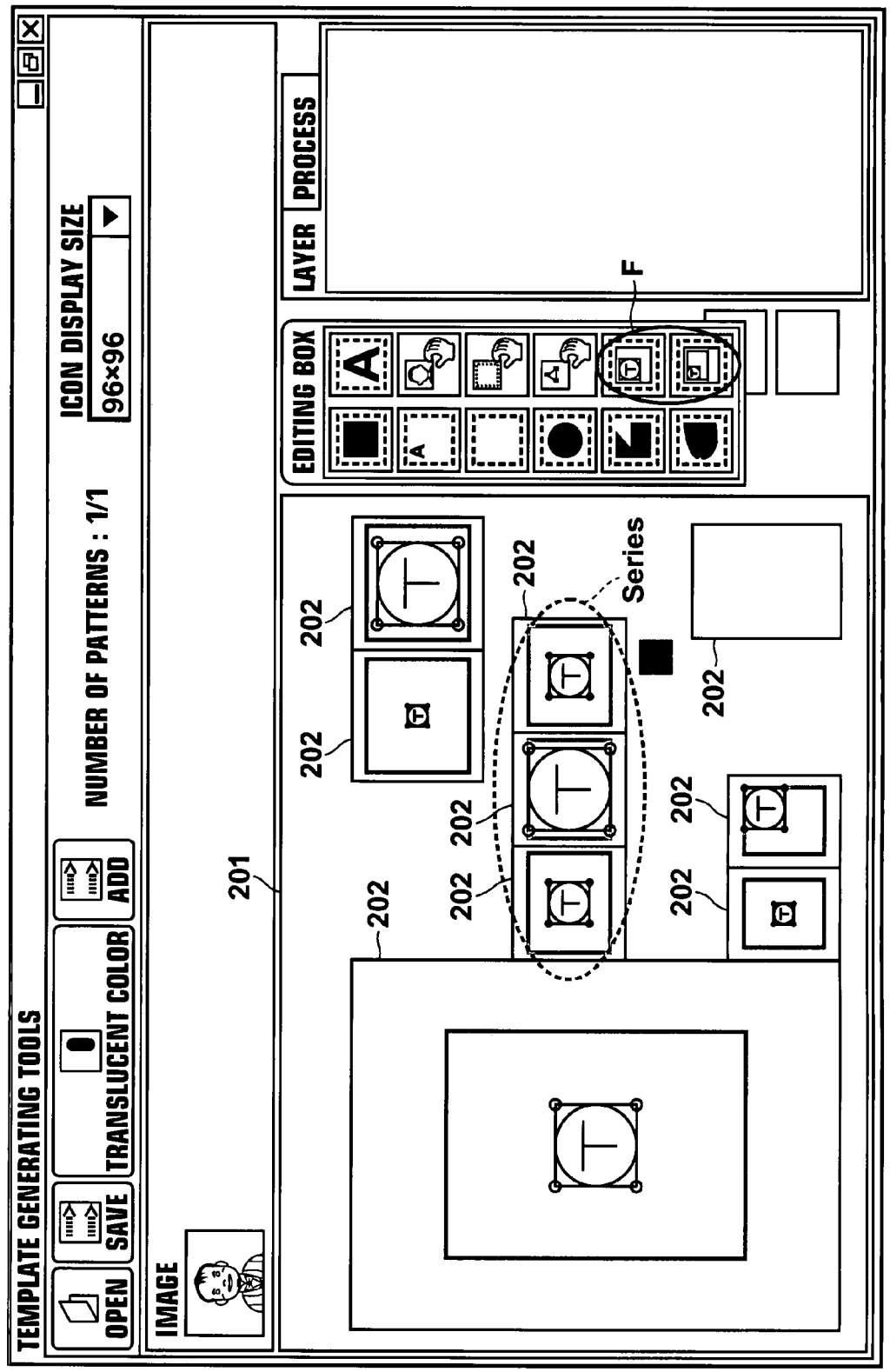

FIRST IMAGE    SECOND IMAGE    THIRD IMAGE

ZOOM

TEMPLATE GENERATING APPARATUS, IMAGE LAYOUT APPARATUS, MODIFIED TEMPLATE GENERATING APPARATUS, AND PROGRAMS THEREFOR

BACKGROUND OF THE INVENTION

1. Field of the Invention

The present invention relates to a template generating apparatus for generating a template used to lay out digital images therein, and an image layout apparatus for laying out digital images in the template.

2. Description of the Related Art

Methods for automatically laying out images, characters, and the like according to prepared templates have been proposed. However, the layouts of templates affect the clearness and attractiveness of the outcomes of automatic layout. Therefore, designers or the like design several layouts in advance, and images and characters are laid out by use of templates having the layouts. More specifically, templates each having frames to insert images or characters therein are prepared in predetermined layout areas, and images and characters are inserted in the frames according to the templates.

In order to realize attractive layouts, images are sometimes subjected to manipulation such as changes in resolution, sizes, shapes, and colors upon insertion thereof in frames. However, some providers (copyright holders) of images wish for no or limited manipulation of the images. For example, logos of companies should not be manipulated. Therefore, unlimited manipulation of images to be inserted in frames is not preferable. For this reason, a system and a method have been proposed in Japanese Unexamined Patent Publication No. 2005-309833 wherein a permitted degree of manipulation is set as a manipulable degree for each image, and images having been manipulated within the permitted degrees are laid out in a template.

Furthermore, upon output of images photographed by digital still cameras or the like on displays or by printers, output images have been generated by laying out images in image insertion areas in image frames in order of input of the images. However, in the case where a plurality of images are laid out in order of input thereof, output images may not look harmonious, depending on the layout of the images. Therefore, a technique has been proposed in Japanese Unexamined Patent Publication No. 2005-184342 wherein layout condition information for defining a layout of objects is assigned to respective image insertion areas in an image frame, and images matching the layout condition information are laid out in the image insertion areas after analysis of the images.

In spite of these conventional techniques, layouts appropriate for photographed scenes may not be achieved by use of prepared templates alone, and correction of templates is often necessary. However, since templates are generated by use of HTML or XML in many cases, setting conditions for an image frame therein is not easy. That is, direct editing of HTML or XML is necessary, which requires special knowledge.

SUMMARY OF THE INVENTION

An object of the present invention is therefore to provide a template generating apparatus for generating a template that enables a person without special knowledge to deal with images of various scenes and an image layout apparatus that lays out images by use of the template.

A template generating apparatus of the present invention comprises:

image area setting means for setting image areas in which images are laid out in a layout area of a predetermined size;

template file saving means for saving information of the image areas laid out in the layout area in a template file; and attribute information adding means for adding attribute information representing attributes of images to be laid out in the respective image areas to the information of the corresponding image areas in the template file.

A program of the present invention causes a computer to function as:

image area setting means for setting image areas in which images are laid out in a layout area of a predetermined size;

template file saving means for saving information of the image areas laid out in the layout area in a template file; and attribute information adding means for adding attribute information representing attributes of images to be laid out in the respective image areas to the information of the corresponding image areas in the template file.

The "layout area" refers to a plane in which elements such as images and characters are laid out.

The "template" refers to a frame representing allocation of the images and the characters, for example.

The "file" refers to a collection of data as a unit managed by an auxiliary storage device, and the "template file" refers to a file storing data regarding the template.

The "information of the image areas" refers to data regarding the image areas, such as a position and a size of each of the image areas in the layout area.

The attribute information adding means may comprise:

image area display means for displaying the image areas set in the layout area on a screen;

attribute information icon display means for displaying on the screen a plurality of attribute information icons used to add the attribute information representing the attributes of the images to be laid out in the respective image areas to the information of the corresponding image areas in the template file; and first attribute information saving means for saving the attribute information corresponding to any one of the displayed attribute information icons that is indicated by the operator via the input receiving means while a corresponding one of the displayed image areas is selected by the operator via the input receiving means, by relating the attribute information to the information of the selected image area in the template file.

The "icons" represent commands to the computer in the form of characters or symbols displayed on the screen. The "commands" refer to instructions that cause the computer to execute specific functions.

The "attribute information icons" refer to icons used to add the attribute information to the information (data) of the image areas.

The attribute information adding means may comprise:

sample image storage means for storing sample images that can be laid out in the image areas in the layout area;

sample image layout means for laying out any one of the sample images in each of the image areas in the layout area;

sample-inserted image display means for displaying an image wherein the sample images have been laid out in the layout area;

confirmation means for confirming the sample images laid out in the layout area as a layout of the displayed image;

image characteristic extraction means for extracting characteristics of the respective sample images laid out in the confirmed image; and second attribute information saving means for saving the extracted characteristics of the respective sample images as the attribute information representing the attributes of the images to be laid out in the corresponding image areas in the layout area having the sample images, by relating the attribute information to the information of the corresponding image areas in the template file.

The "characteristics" refer to characteristics specific to the images and different from other images. In other words, the characteristics refer to characteristics that characterize the images. For example, the characteristics of the images refer to a color characteristic such as lightness, saturation, and luminance thereof, a photography condition thereof, and a characteristic representing an object or a structure therein.

The "sample images" refer to images that can be used as samples.

The attribute information may represent a position and a size of the face of a photographed person within an image.

The attribute information may represent image composition.

The attribute information may represent the image composition by use of a vanishing point.

Alternatively, the attribute information may represent a relationship between the images to be laid out in the respective image areas in the same layout area.

An image layout apparatus of the present invention comprises:

template file storage means for storing the template file generated by use of the template generating apparatus of the present invention;

object image storage means for storing a plurality of object images that are laid out in the image areas in the layout area;

characteristics extraction means for extracting characteristics of the object images; and image layout means for laying out in the image areas the object images in accordance with the attribute information added to the information of the image areas in the layout area of the template file, based on the extracted characteristics of the object images.

Another program of the present invention causes a computer to function as:

characteristics extraction means for extracting characteristics of object images that are laid out in the image areas in the layout area and stored in object image storage means; and image layout means for laying out in the image areas the object images in accordance with the attribute information added to the information of the image areas in the layout area of the template file that has been generated by use of the template generating apparatus of the present invention and stored by template file storage means, based on the extracted characteristics of the object images.

The "object images" refer to images as targets of layout in the layout area of the template.

A modified template generating apparatus of the present invention comprises:

layout image display means for displaying an image having the object images laid out in the layout area according to the template file by use of the image layout apparatus of the present invention;

image modification means for carrying out modification of the image areas and/or the object images laid out in the image areas in the layout area;

modified image display means for displaying on a screen the image having been modified;

modified image confirmation means for confirming the modification in the displayed image; and modified template file saving means for saving a template file having the information of the image areas corresponding to the modified image by adding the attribute information corresponding to the object images laid out in the image areas to the information of the image areas.

Still another program of the present invention causes a computer to function as:

layout image display means for displaying an image having the object images laid out in the layout area according to the template file by use of the image layout apparatus of the present invention;

image modification means for carrying out modification of the image areas and/or the object images laid out in the image areas in the layout area;

modified image display means for displaying on a screen the image having been modified;

modified image confirmation means for confirming the modification in the displayed image; and modified template file saving means for saving a template file having the information of the image areas corresponding to the modified image by adding the attribute information corresponding to the object images laid out in the image areas to the information of the image areas.

According to the present invention, by generating the template having the attribute information representing the attributes of the images to be laid out in the image areas in the layout area, images close to images intended by a creator of the template can be automatically laid out in the image areas.

Through generation of the template by displaying the icons representing the attribute information and by setting the attribute information for the image areas by use of the icons upon addition of the attribute information to the image areas, the attribute information can be set to the image areas during confirmation of the layout.

Alternatively, by adding to the image areas the attribute information in accordance with the characteristics extracted from the sample images laid out in the respective image areas in the layout area, an image close to the layout of the sample images can be generated automatically.

If the attribute information represents the position and the size of the face of a photographed person within an image, an image having a composition similar to the person can be laid out.

If the attribute information represents composition, an image having similar composition can be laid out.

In the case where the attribute information represents the relationship between the images to be laid out in the image areas in the layout area, images related to each other, such as images photographed serially, can be laid out according to an intention of the creator of the template.

By extracting the characteristics of the object images and by laying out the object images in accordance with the attribute information added to the image areas of the layout area in the corresponding image areas of the template, the object images can be laid out automatically in accordance with an intention of the creator of the template.

Furthermore, by modifying the image having the object images laid out in the layout area according to the template and by generating the modified template corresponding to the modified image, the template can be prepared appropriately for the object images of various scenes.

BRIEF DESCRIPTION OF THE DRAWINGS

FIG. 1 shows the configuration of an image generation system of a first embodiment of the present invention;

FIG. 2 shows the configuration of a template generating apparatus in the first embodiment;

FIG. 3 shows an example of a layout area;

DESCRIPTION OF THE PREFERRED EMBODIMENTS

Figure 4:
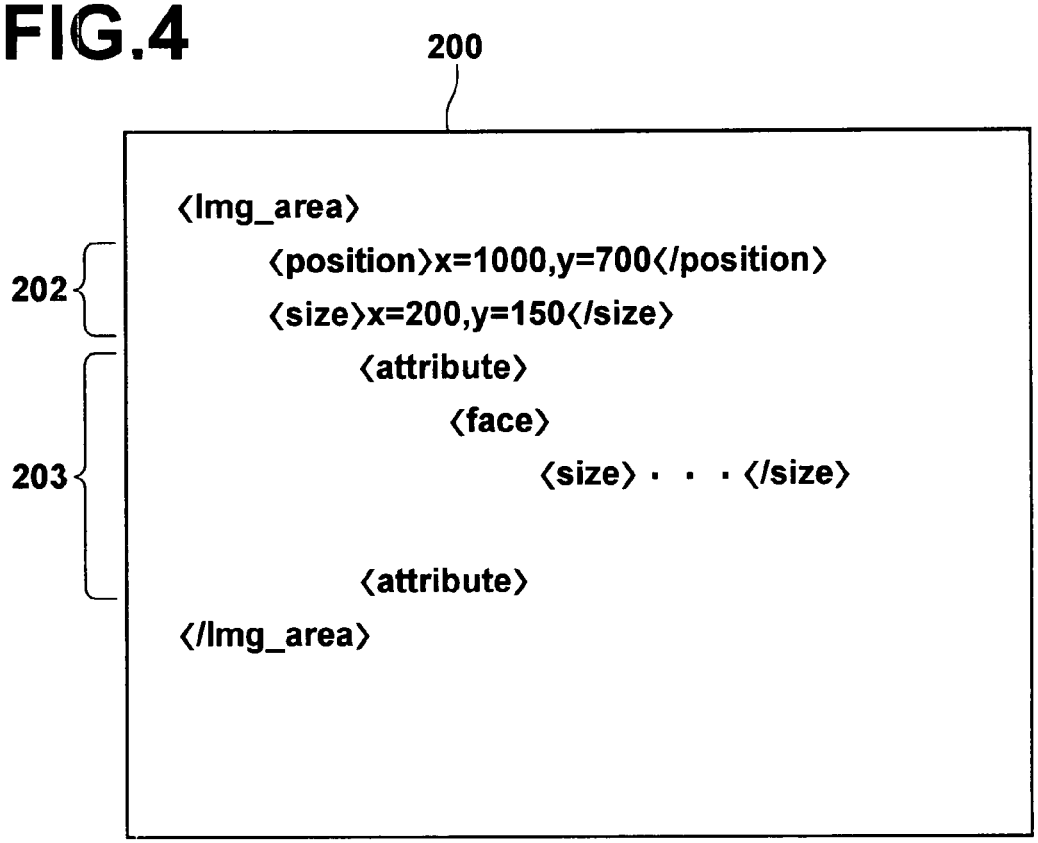
FIG. 4 shows an example of a template file.

Hereinafter, a first embodiment of the present invention will be described with reference to the accompanying drawings. As shown in FIG. 1, an image generation system 1 in this embodiment comprises a template generating apparatus 2 for generating a template, an image layout apparatus 3 for laying out images by using the template, and a network 4.

The template generating apparatus 2 and the image layout apparatus 3 in the image generation system 1 are realized by execution of programs read into auxiliary storage devices or the like by computers (such as workstations). The template generating apparatus 2 is realized by execution of a template generation program while the image layout apparatus 3 is realized by execution of an image generation program. The programs are stored in information storage media such as CD-ROMs and installed respectively in the computers. Alternatively, the programs are distributed via a network such as the Internet and installed in the computers.

The template generating apparatus 2 is placed where template layouts are designed, and templates according to designs of designers are generated by use of the template generating apparatus 2 and stored as template files 200.

The image layout apparatus 3 is placed in a factory or the like where photo albums are generated by manipulation of photographs. The image layout apparatus 3 stores object images Obj to be laid out in templates, and receives the template files 200 generated by the template generating apparatus 2 via the network 4 or the like to store the files. An operator selects one of the stored template files 200 appropriate for the object images Obj and generates an electronic photo album.

The network 4 may be any kind of network, such as the Internet, a LAN, or a WAN, and connects the template generating apparatus 2 with the image layout apparatus 3.

FIG. 2 shows the configuration of the template generating apparatus 2.

The template generating apparatus 2 comprises a display device 20 for displaying an image on a screen, image area setting means 21 for setting image areas in which images are laid out in a layout area, template file saving means 22 for saving information and the like of the image areas of the layout area in a corresponding one of the template files 200 (hereinafter referred to as the template file 200), template file storage means 23 for storing the template files 200, and attribute information adding means 24 for adding attribute information representing attributes of images to be laid out in the image areas to the information of the image areas in the template file 200.

The attribute information adding means 24 comprises image area display means 241, attribute information icon display means 242, and first attribute information saving means 243. The image area display means 241 displays the image areas set in the layout area on the screen. The attribute information icon display means 242 displays on the screen of the display device 20 a plurality of attribute information icons used to add the attribute information representing the attributes of images to be laid out in the image areas to the information of the image areas of the template file 200. The first attribute information saving means 243 saves the attribute information corresponding to an indicated one of the displayed attribute information icons by relating the attribute information to the information of a selected one of the image areas in the template file 200 in response to selection of the image area while the icon is being indicated.

As shown in FIG. 3, each of the template files 200 stores data (the information of the image areas) such as a position and a range (size) of each of image areas 202 in a layout area 201 and attribute information 203 representing conditions and the like of images to be laid out in the respective image areas. More specifically, the template files may be files wherein the position and the size of each of the image areas are defined by use of XML or the like while being related to the attributes of images to be laid out in the image areas. The layout area 201 may include not only the image areas 202 for image insertion but also a character area (not shown) in which characters and the like are inserted.

As shown in FIG. 4, the attribute information 203 is stored in relation to the data of the corresponding image areas 202. The attribute information 203 may be information regarding a person in an image, information regarding composition of an image, and information regarding scenery in an image and a photography condition therefor, for example. The attribute information 203 on a person includes a size of the face, a center position of the face (such as a midpoint between right and left eyes), and face orientation. In the case of presence of a plurality of faces, the attribute information 203 includes a position, a height, and a width of a rectangular shape surrounding the plurality of faces, for example. The attribute information 203 on composition may include a structural line, a position of a vanishing point, and the like. The information 203 on scenery and photography condition refers to photography of sunset, at night, in daytime, in daylight, with flash, and in backlight, for example.

The attribute information 203 may represent a relationship between the image areas 202. For example, in the case where three of the image areas 202 are aligned as shown by a part "Series" surrounded by broken lines in FIG. 3, the three image areas 202 may accompany the attribute information added to the data of the three image areas 202 and representing that images photographed serially or images in serial zooming of a face are inserted therein.

The image area setting means 21 sets the position and the range of each of the image areas 202 in the layout area 201 displayed in the screen. More specifically, the image area setting means 21 sets the position and the range of each of the image areas 202 in response to setting of a frame thereof in the layout area 201 on the screen by use of a pointing device such as a mouse, for example.

The template file saving means 22 saves the data regarding the position and the range of each of the image areas 202 set in the layout area 201, in the template file 200.

The image area display means 241 displays the image areas 202 laid out in the layout area 201 on the screen. The image area display means 241 displays the image areas 202 in a manner different from the layout area 201 as a background so that the position and the range of each of the image areas 202 can be understood in the layout area 201. For example, the image area display means 241 displays the image areas 202 by framing the areas or in a color different from the layout area 201. At the time of display of the image areas 202, the image area display means 241 may display on the screen of the display device 20 the image areas 202 as has been set by the image area setting means 21, or according to the data stored in the template file 200.

Figure 17:
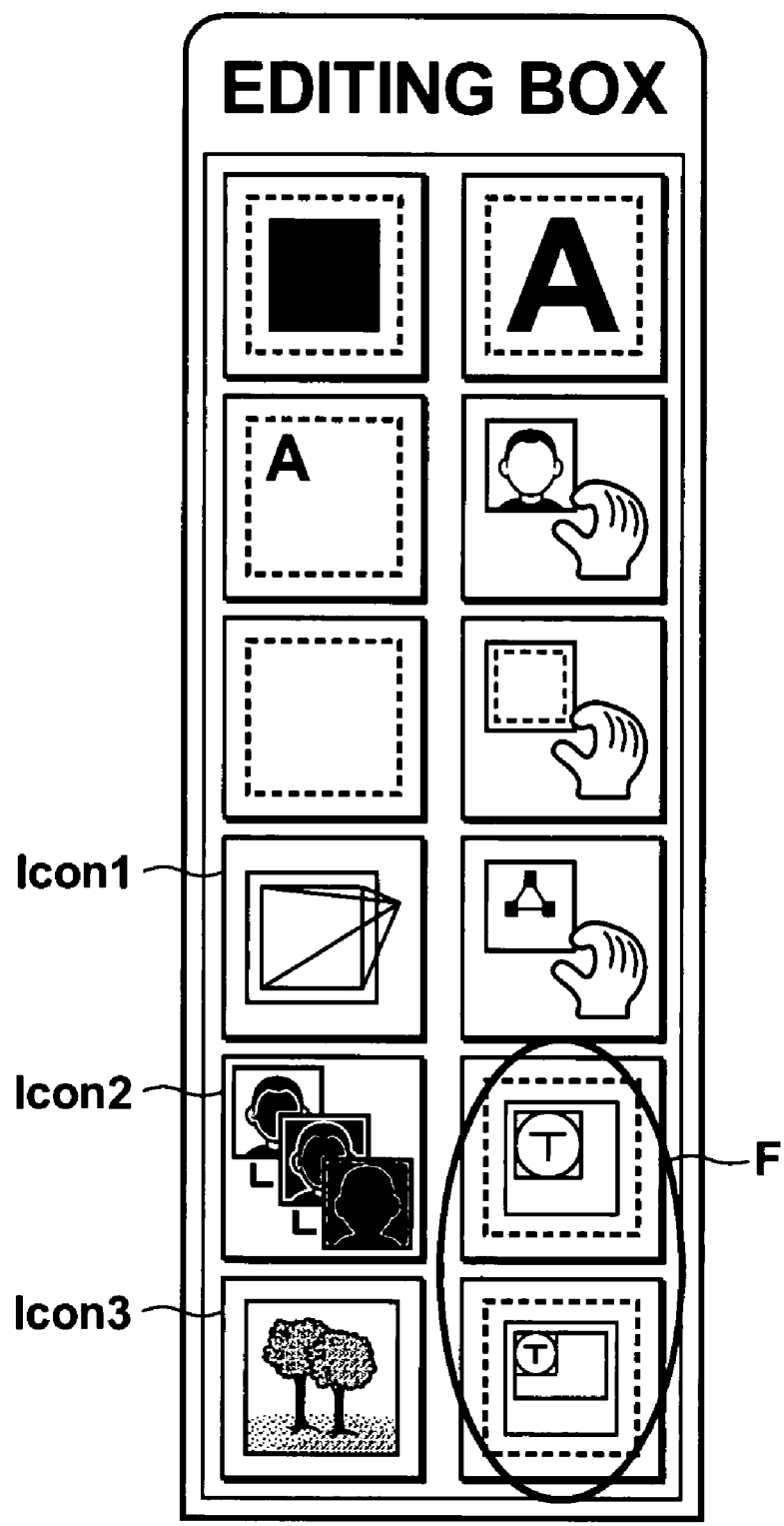
FIG. 17 shows examples of icons.

The attribute information icon display means 242 displays the attribute information icons (such as icons in an editing box on the right of FIG. 3) representing the image attributes that can be set for the respective image areas 202 on the screen. The attribute information icons are preferably displayed as marks different from each other according to the corresponding attributes. For example, if some of the attribute information icons represent the attribute information regarding face, the icons are displayed as marks representing face as shown by F in FIG. 3. These icons are used to set the attribute information regarding face. In addition, the attribute information icons include Icon1 used to set an attribute on perspective composition, Icon2 used to insert serial or similar images, and Icon3 used to insert a non-figure image such as a scenery image, as shown in FIG. 17. The icons in the editing box may be changed upon necessity.

The template file storage means 23 is a large-capacity storage device such as a hard disk, and stores the template files 200.

The first attribute information saving means 243 saves in the template file 200 the attribute information 203 of the attribute information icon indicated by a user, by relating the attribute information 203 to the data of the corresponding image area 202 selected by the user. More specifically, the user drags one of the attribute information icons displayed on the screen by use of the pointing device such as a mouse to the frame of the corresponding image area 202, and drops the icon in the area to select the image area 202. In this manner, the attribute information 203 of the icon is related to the data of the selected image area 202, and saved in the template file 200.

In the case where one of the face attribute information icons F shown in FIG. 3 is dragged and dropped to a specific one of the image areas 202, for example, the face mark is displayed in the image area 202. By changing a position and a size of the face mark in the image area 202, how an image with a face of what size is laid out at which position in the image area 202 can be set. In addition, the size and the center position of the face can be determined in the image area, based on the position and the size of the face mark set in the image area 202. The orientation of the face can also be set by input of an angle from a keyboard or the like. When a "Save" button or the like displayed on the screen is clicked after setting of the attribute information 203 of the image area 202, the face attribute information 203 in accordance with the size, the position, and the orientation of the face set in the layout area 201 is saved in the template file 200 by being related to the data of the image area 202.

A plurality of items of the attribute information 203 can be set for any one of the image areas 202. For example, in the case where the attribute information 203 on face is set to one of the image areas 202 together with the attribute information 203 representing photography in daytime, an image agreeing with both of the conditions (an image photographed in daytime and including a face having the position, the size, and the orientation that have been set) becomes appropriate for insertion in the image area 202.

Figure 5:
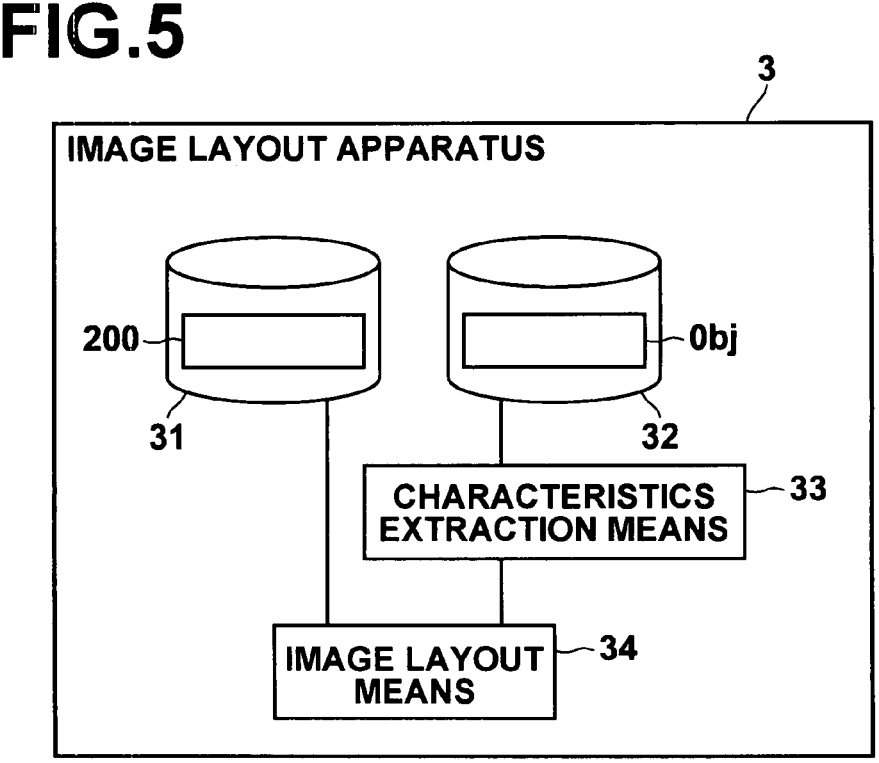
FIG. 5 shows the configuration of an image layout apparatus in the first embodiment.

FIG. 5 shows the configuration of the image layout apparatus 3.

The image layout apparatus 3 comprises template file storage means 31 for storing the template files 200 generated by the template generating apparatus 2, object image storage means 32 for storing the object images Obj to be laid out in the image areas 202 in the layout area 201, characteristics extraction means 33 for extracting characteristics of the object images Obj, and image layout means 34 for laying out in the image areas 202 in the layout area 201 of the template file 200 the object images Obj corresponding to the attribute information 203 added to the data of the image areas 202 based on the extracted characteristics of the object images.

The object images Obj are images as targets of layout in the image areas 202 in the layout areas 201 of the templates. More specifically, the object images are digital photographic images received from clients for generation of electronic photo albums, for example.

The characteristic extraction means 33 extracts hue, saturation, lightness, a photographed face, a photography condition, and composition of each of the object images as the characteristics thereof. More specifically, histograms of hue, saturation, and lightness are extracted as the characteristics. In addition, a face is detected by use of a face detector (see Japanese Unexamined Patent Publication Nos. 2005-250771, 2005-250772, and the like filed by the assignee of the present invention, for example), and presence or absence of a face, a position and a size of the face, orientation of the face, and the number of faces are also extracted as the characteristics. Alternatively, a photography condition is judged by use of an image detector (see Japanese Unexamined Patent Publication Nos. 2005-122720, 2005-310123, and the like filed by the assignee of the present invention, for example), and various photography conditions such as photography at night or in daytime and photography of sunset are extracted as the characteristics.

Figure 6:
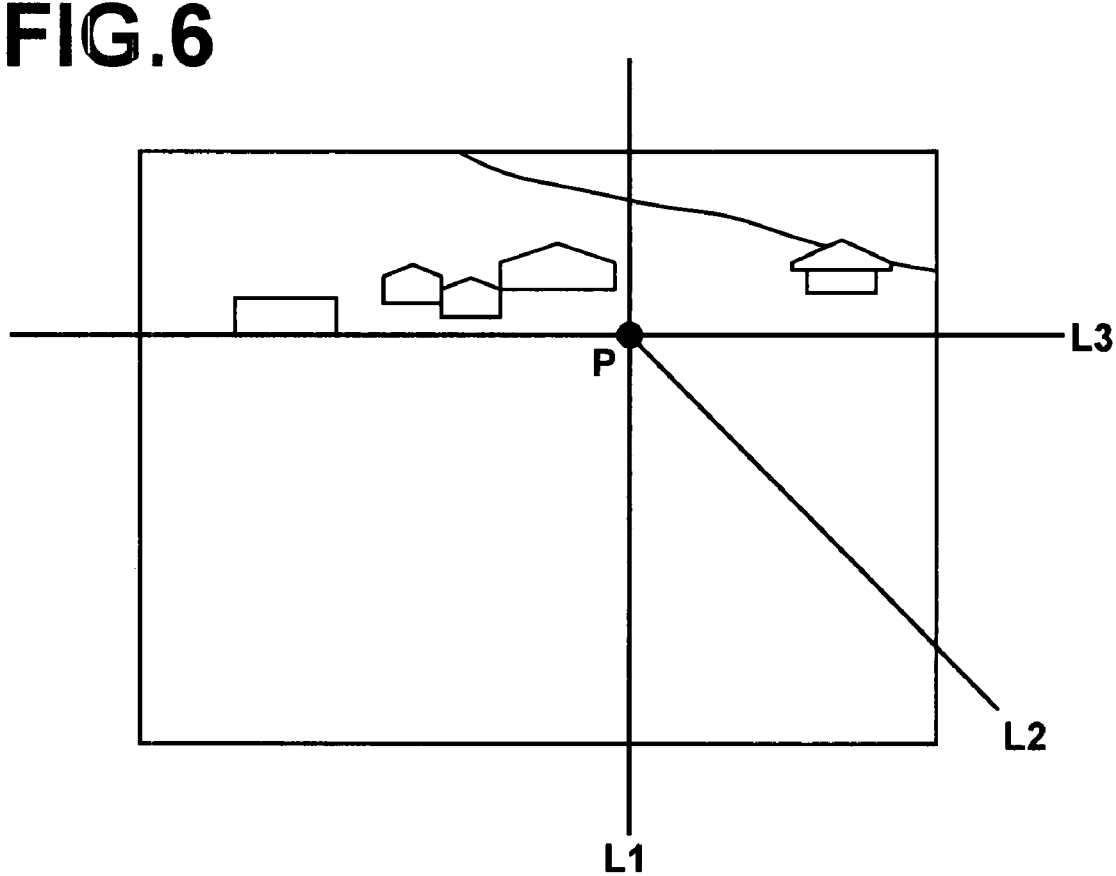
FIG. 6 shows structural lines and a vanishing point.

Furthermore, a structural line and a vanishing point are extracted as the characteristics representing image composition. The structural line is extracted from lines detected by Hough transform or the like carried out on points on an edge detected by an edge detection filter or the like. For example, in the case where edge extraction is carried out in an image of a road shown in FIG. 6, lines L1 and L2 as both sides of the road and a line L3 as a horizontal line are detected. The lines L1 to L3 are extracted as the structural lines and a point P at which the extracted lines intersect is detected as the vanishing point. The structural lines L1 to L3 and the vanishing point P detected in this manner enable estimation of depth feel or extent of the image, and are extracted as the characteristics.

It is preferable for all the characteristics such as hue, saturation, lightness, a detected face, a photography condition, and composition to be extracted from each of the images, instead of extraction of only one characteristic.

The image layout means 34 reads the data of the image areas 202 stored in the template file 200 as well as the attribute information 203 set for the respective image areas 202, and compares the characteristics extracted by the characteristics extraction means 33 with the attribute information 203. The image layout means 34 lays out the object images Obj having the closest characteristics to the conditions set for the respective image areas 202 in the corresponding image areas 202.

Figure 7:
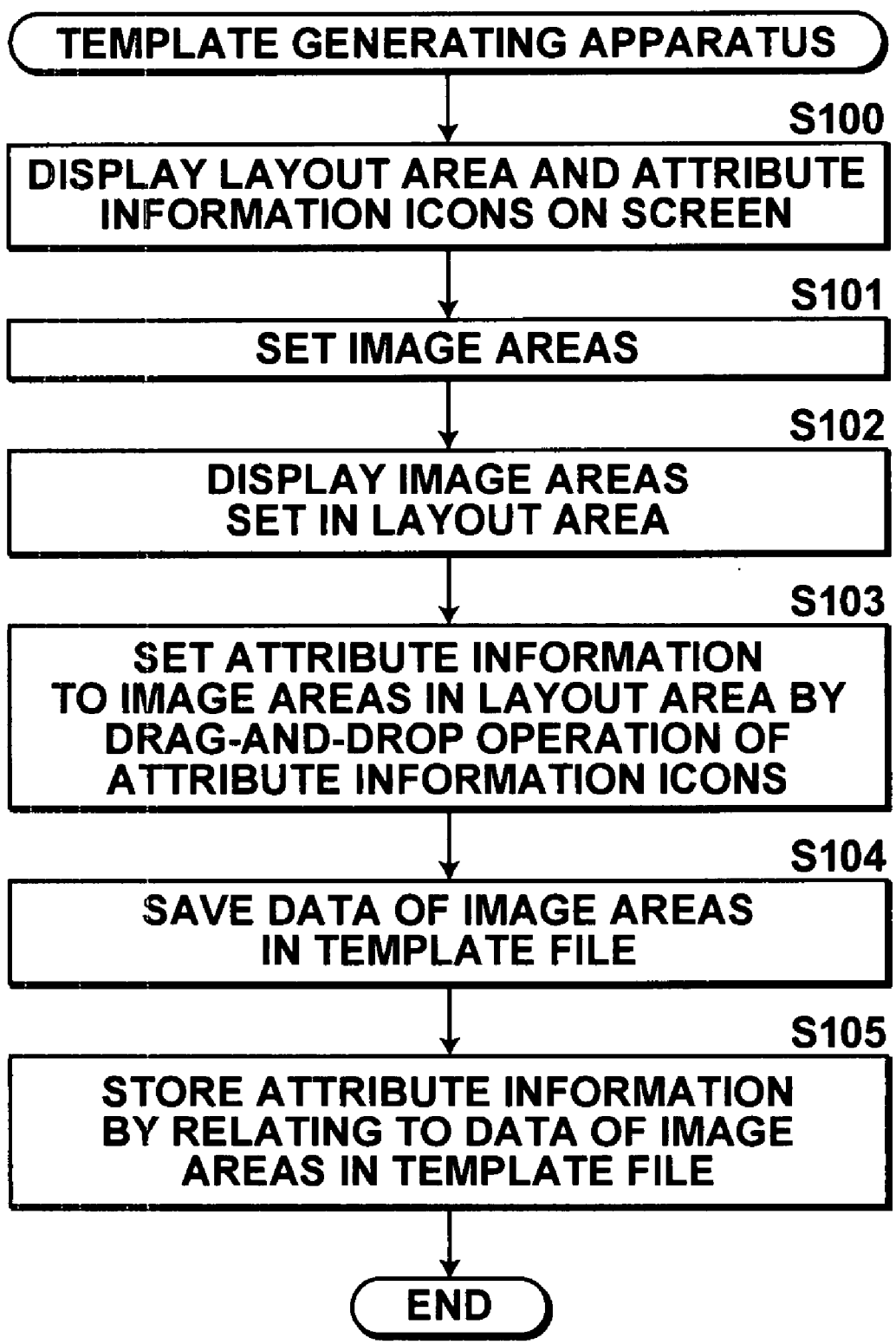
FIG. 7 is a flow chart showing procedures in the template generating apparatus in the first embodiment.
Figure 8:
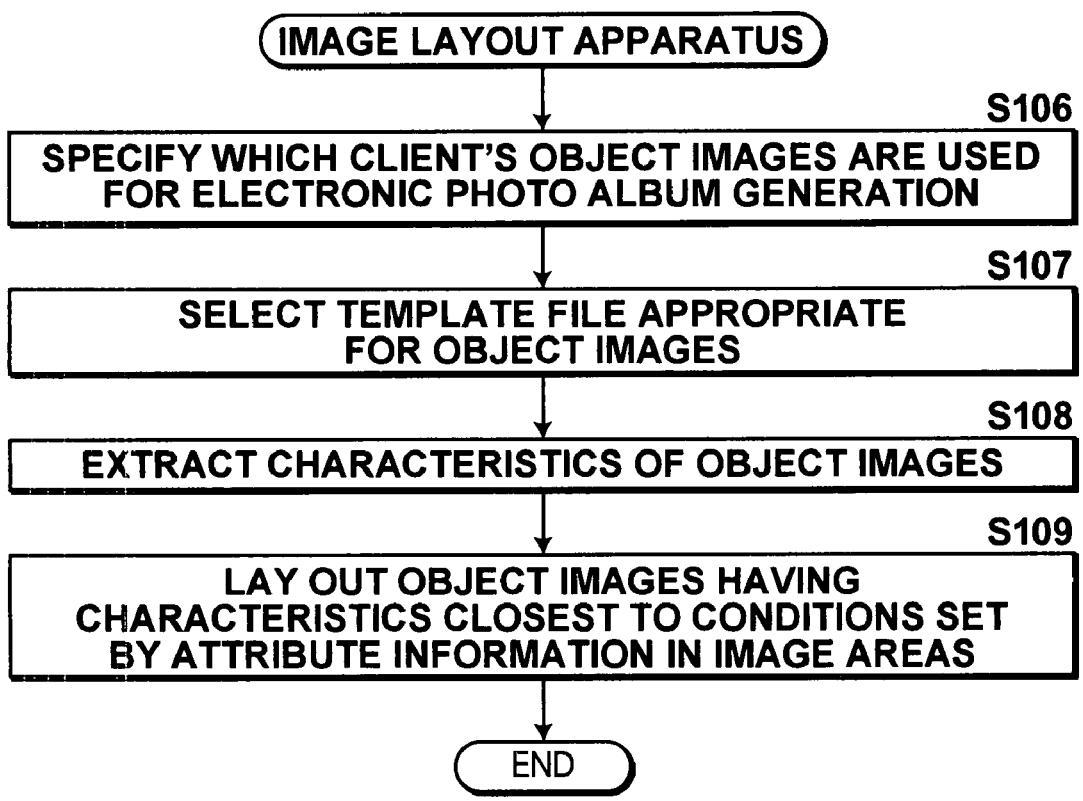
FIG. 8 is a flow chart showing procedures in the image layout apparatus.

Hereinafter, procedures of generation of the template file 200 by the template generating apparatus 2 and automatic layout of the object images Obj by the image layout apparatus 3 according to the template file 200 will be described with reference to flow charts shown in FIGS. 7 and 8. Firstly, the procedures in the template generating apparatus 2 will be described according to the flow chart in FIG. 7.

According to one of the template layouts determined by a designer, the template generating apparatus 2 firstly generates the template. Therefore, after the template generating apparatus 2 has been started, the layout area 201 is displayed on the screen together with the editing box in which the attribute information icon display means 242 lays out the attribute information icons (S100). The user sets the image areas 202 as necessary in the layout area 201 by use of the image area setting means 21 while using the mouse or the like (S101), and the image area display means 241 displays the image areas 202 in the layout area 201 on the screen (S102).

Thereafter, the user drags and drops one of the attribute information icons, for setting the attribute information 203 in the corresponding one of the image areas 202 in the layout area 201 by use of the first attribute information saving means 243 (S103). The user clicks the Save button or the like with the mouse after the attribute information 203 has been assigned to the respective image areas 202, and the template file saving means 22 saves the data of the image areas 202 in the template file 200 (S104). The attribute information 203 is stored in the template file 200 by being related to the corresponding image areas 202 (S105). The template file 200 is stored by the template file storage means 23.

The template file 200 generated in this manner is sent from the template generating apparatus 2 via the network 4 to the image layout apparatus 3, and stored in the template file storage means 31 of the image layout apparatus 3. Hereinafter, the procedures in the image layout apparatus 3 will be described with reference to the flow chart in FIG. 8.

The object images stored in the object image storage means 32 are the images regarding which the clients have requested generation of electric photo albums. Upon generation of an electric photo album, an operator specifies which of the clients' object images Obj in the object image storage means 32 are used for the generation (S106). The operator displays the layouts (the layout areas and the image areas) of the template files 200 stored in the template file storage means 31, and selects one of the template files appropriate for scenes of the object images Obj (S107).

The characteristics extraction means 33 extracts the characteristics from the object images Obj used for generation of the electric photo album (S108). The image layout means 34 reads the data such as the position and the size of each of the image areas 202 stored in the selected template file 200 and the attribute information 203 corresponding to the image areas 202, and lays out the object images Obj whose characteristics extracted by the characteristics extraction means 33 are closest to the conditions set for the corresponding image areas 202 (S109).

Figure 9:
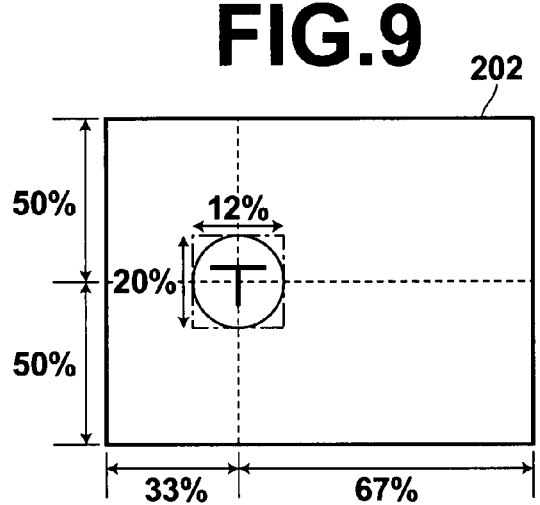
FIG. 9 shows a relationship between an image area and face attribute information.

For example, in the case where one of the image areas 202 has the attribute information on faces representing a face having a size that is 12% and 20% of horizontal and vertical lengths of the frame of the image area 202 and having the center located at 50% and 33% of the vertical length and the horizontal length from the left, the object image Obj having the face position and the size closet to the conditions is selected and inserted in the image area, as shown in FIG. 9.

Figure 10:
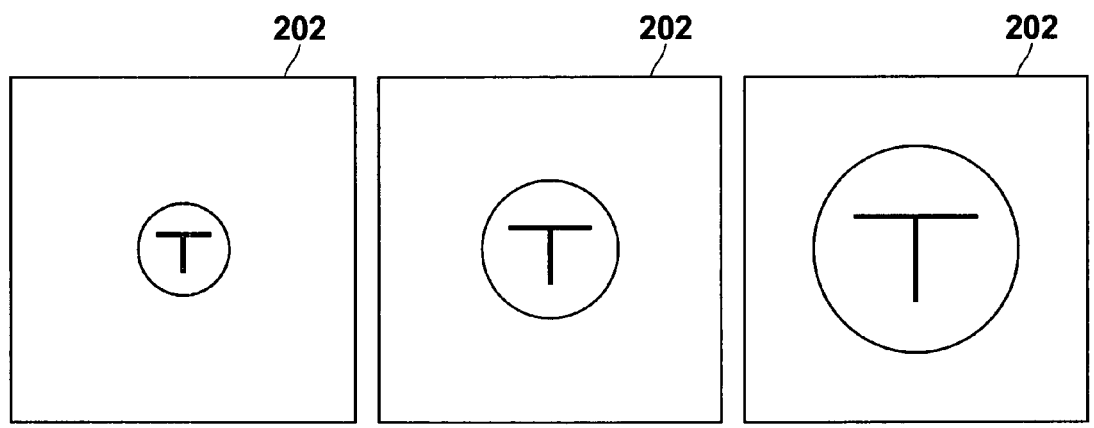
FIG. 10 explains attribute information related to zoomed face images.

Alternatively, as shown in FIG. 10, in the case where the attribute information 203 regarding zoomed faces has been set to three of the image areas 202 aligned consecutively, the object image Obj in accordance with the attribute information on faces set to the first image area 202 is selected first. Thereafter, the image zoomed around the face according to zooming ratios set for the second and third image areas 202 is inserted in the second image area and in the third image area.

As has been described above, by automatically laying out the object images closest to the attribute information of the respective image areas in the template, the electric photo album can be generated by automatically laying out the images closest to an intention of the designer of the template.

In the embodiment described above, the respective computers function as the template generating apparatus 2 and the image layout apparatus 3. However, one computer may function as the template generating apparatus 2 and the image layout apparatus 3 by installation of the template generation program and the image layout program therein.

A second embodiment of the present invention will be described next. In the second embodiment, a method will be described wherein a template generating apparatus generates a template by use of sample images and attribute information is set for each of image areas based on characteristics extracted from the sample images. In this embodiment, the same elements as in the first embodiment have the same reference codes, and detailed description thereof will be omitted.

Figure 11:
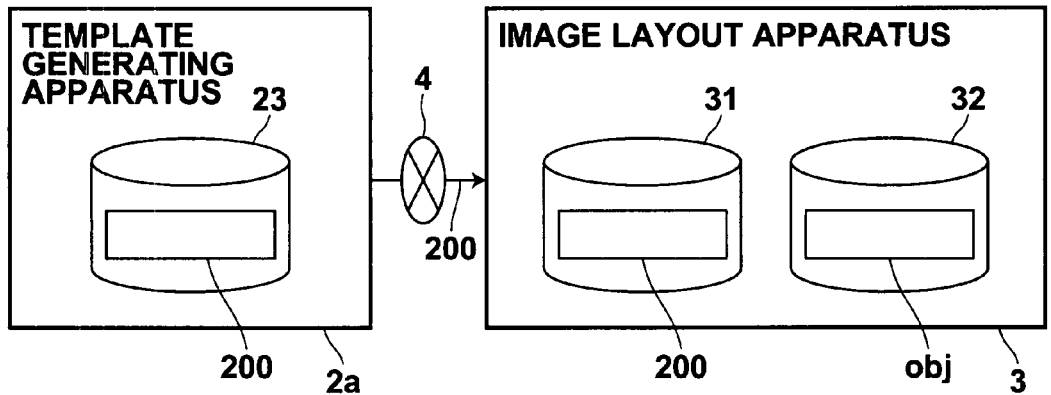
FIG. 11 shows the configuration of an image generation system of a second embodiment of the present invention.

An image generation system 1a in this embodiment comprises a template generating apparatus 2a for generating a template, an image layout apparatus 3 for laying out images by using the template, and a network 4, as shown in FIG. 11. The image layout apparatus 3 and the network 4 are the same as in the first embodiment, and detailed description thereof will be omitted.

Figure 12:
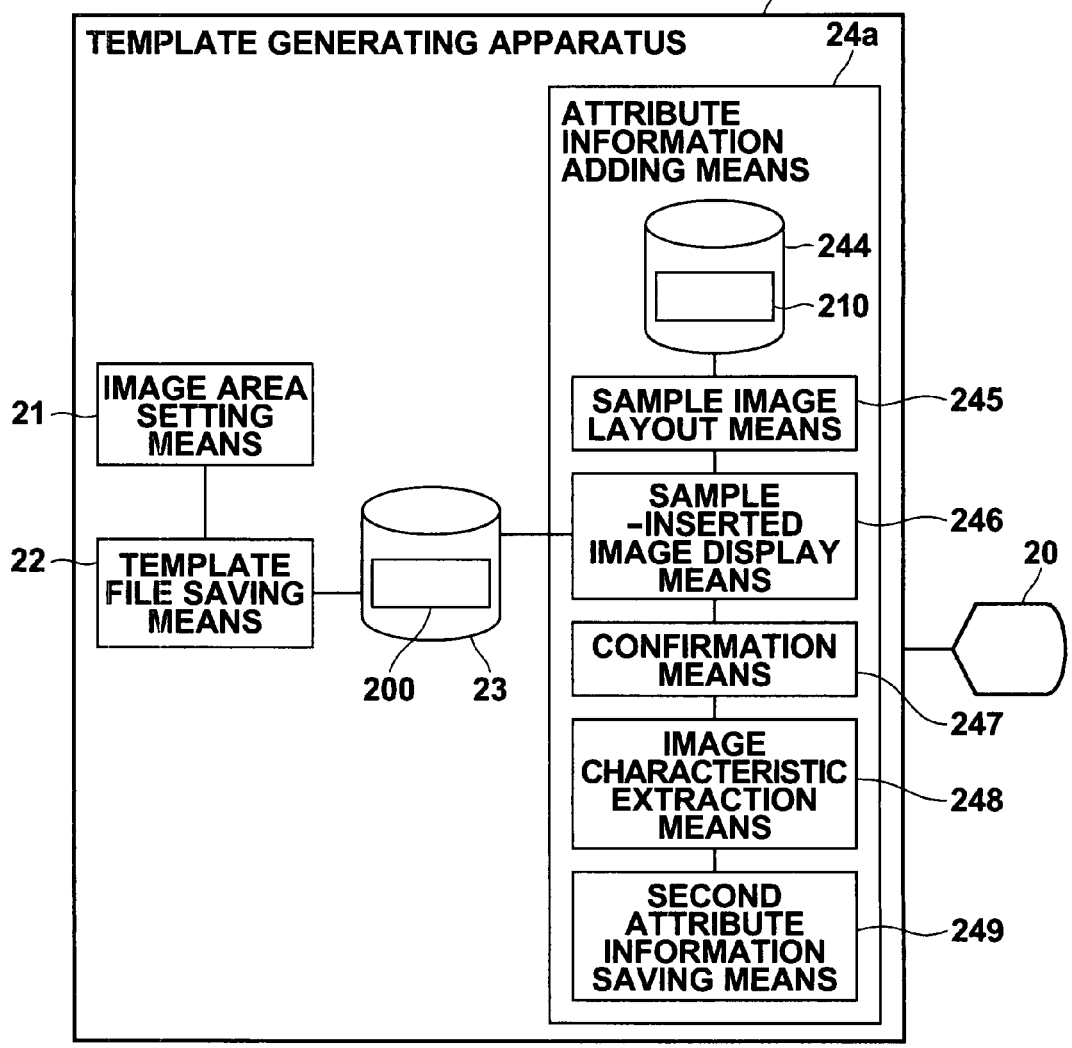
FIG. 12 shows the configuration of a template generating apparatus in the second embodiment.

FIG. 12 shows the configuration of the template generating apparatus 2a. The template generating apparatus 2a comprises a display device 20 for displaying an image on a screen, image area setting means 21 for setting image areas 202 in which images are inserted in a layout area 201, template file saving means 22 for saving data of the image areas 202 of the layout area 201 in a template file 200, template file storage means 23 for storing the template file 200, and attribute information adding means 24a for adding attribute information 203 representing attributes of images to be laid out in the respective image areas 202 to the data of the corresponding image areas 202 in the template file 200.

The attribute information adding means 24a in this embodiment comprises sample image storage means 244 for storing sample images Smp that can be laid out in the image areas 202 of the layout area 201, sample image layout means 245 for laying out any one of the sample images Smp in each of the image areas 202 in the layout area 201, sample-inserted image display means 246 for displaying an image in which the sample images Smp have been laid out in the layout area 201, confirmation means 247 for confirming the sample images Smp laid out in the layout area 201 as a layout of the displayed image, image characteristic extraction means 248 for extracting characteristics of the sample images Smp in the confirmed image, and second attribute information saving means 249 for saving the extracted characteristics of the sample images Smp as the attribute information 203 representing attributes of images to be laid out in the respective image areas 202 of the layout area 201 by relating the attribute information to the data of the image areas 202 in the template file 200.

The sample image storage means 244 is a large-capacity storage device such as a hard disk, and stores the sample images.

The sample images Smp are digital photographic images, for example. It is preferable for the sample images Smp to be suitable for photo album generation.

A designer or the like (hereinafter referred to as the designer) uses the sample image layout means 245, for selection of the sample images Smp suitable for insertion in the respective image areas 202 from the sample images Smp stored in the sample image storage means 244 and for layout of the selected sample images Smp in the image areas 202 while displaying the image areas 202 set by the image area setting means 21 in the layout area 201 on the screen. More specifically, thumbnail images of the sample images Smp are displayed on the screen and the thumbnail image of an appropriate one of the sample images Smp is dragged and dropped to a corresponding one of the image areas 202.

The sample-inserted image display means 246 displays an image in which the sample images Smp have been inserted in the layout area 201 by the sample image layout means 245, on the screen of the display device 20.

The confirmation means 247 receives an input from an input device such as a keyboard or a mouse so as to confirm the displayed image in the case where the layout of the sample images Smp and positions and sizes of the image areas 202 are appropriate after the designer confirms the image displayed on the screen by the sample-inserted image display means 246.

The image characteristic extraction means 248 extracts the characteristics from the sample images Smp laid out in the layout area 201. More specifically, the image characteristic extraction means 248 extracts hue, saturation, and lightness as the characteristics. The image characteristic extraction means 248 also carries out face detection by use of a face detector, and extracts as the characteristics a position, a size, and orientation of a face, as well as the number of faces in the case of presence of the faces. Furthermore, the image characteristic extraction means 248 carries out extraction of a photography condition (such as photography in daytime or at night or in sunset) by use of an image detector and extraction of image composition (such as a structural line and a vanishing point). The photography condition and the composition are also used as the characteristics.

The second attribute information saving means 249 generates the attribute information 203 based on the extracted characteristics of the sample images Smp obtained by the image characteristic extraction means 248, and saves the attribute information 203 in the template file 200 by relating the information 203 to the data of the corresponding image areas 202 in which the sample images Smp have been laid out.

Figure 13:
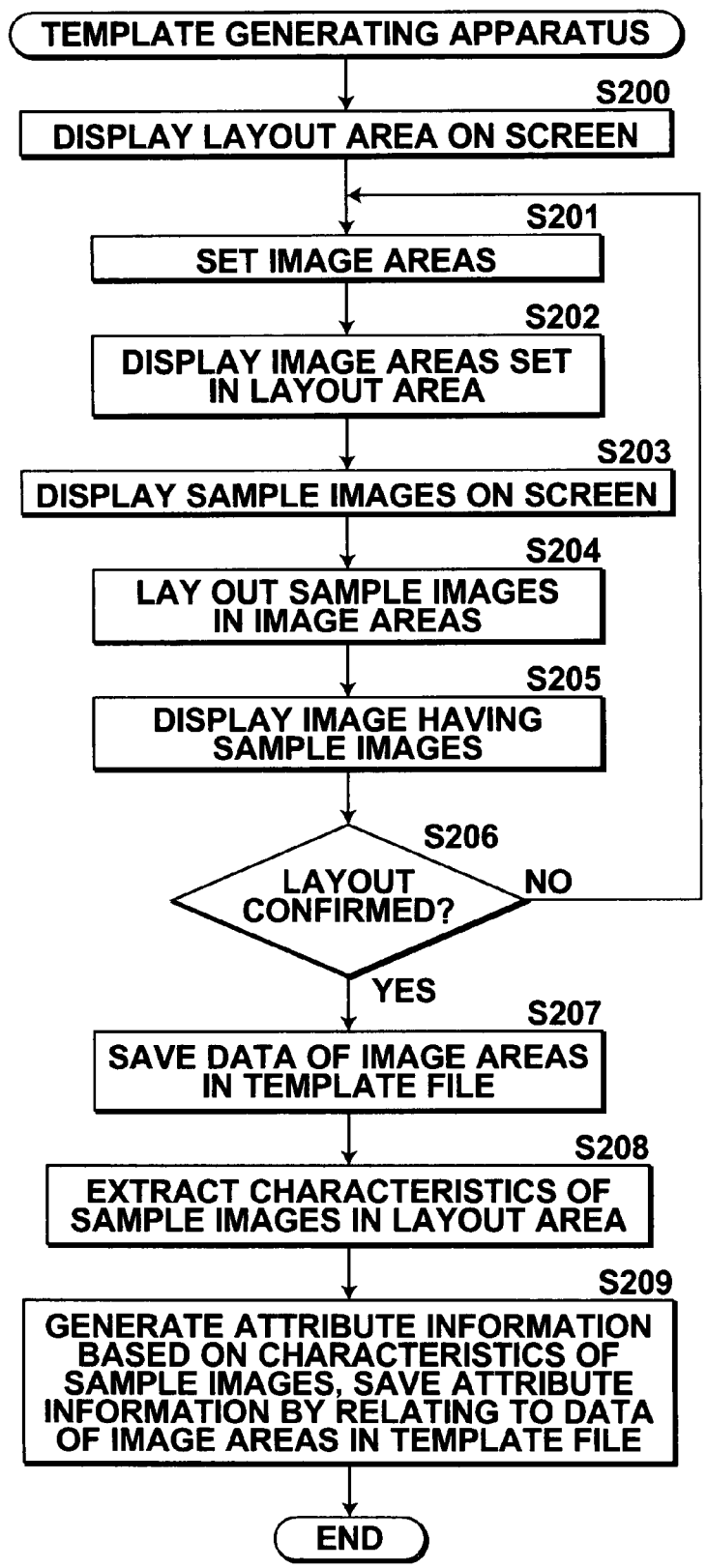
FIG. 13 is a flow chart showing procedures in the template generating apparatus in the second embodiment.

Hereinafter, procedures of generation of the template file 200 by use of the template generating apparatus 2a and automatic layout of object images Obj by the image layout apparatus 3 according to the template file 200 will be described with reference to a flow chart shown in FIG. 13.

Firstly, the designer generates the template by use of the template generating apparatus 2a. Therefore, the designer starts the template generating apparatus 2a, and selects the layout area 201 of an appropriate size to display the layout area 201 on the screen of the template generating apparatus 2a (S200). The designer uses the image area setting means 21 for setting the image areas 202 with the mouse or the like in the layout area 201 (S201). The image areas 202 set in the layout area 201 are displayed on the screen (S202).

The thumbnail images of the sample images Smp stored in the sample image storage means 244 are displayed on the screen (S203). The designer uses the sample image layout means 245 for laying out appropriate ones of the displayed thumbnail images in the respective image areas 202 by dragging and dropping the images with the mouse or the like (S204). The sample-inserted image display means 246 displays the image in which the sample images have been inserted in the layout area 201 (S205). The designer continues to change the sizes of the image areas or the inserted sample images Smp while viewing the image until he/she is satisfied with the layout (S201~S205). After the layout becomes satisfactory, the designer clicks a "Save" button or the like on the screen with the mouse for conformation of the layout by the confirmation means 247 (S206).

After confirmation of the layout, the template file saving means 22 saves the data of the image areas 202 in the template file 200 (S207). The image characteristic extraction means 248 extracts the characteristics of the sample images Smp laid out in the layout areas 201 (S208). The second attribute information saving means 249 generates the attribute information 203 based on the extracted characteristics of the sample images Smp, and stores the attribute information 203 in the template file 200 while relating the attribute information 203 to the data of the image areas 202 in which the respective sample images have been laid out (S209). The template file storage means 23 stores the template file 200.

The template file 200 generated in this manner is sent from the template generating apparatus 2a via the network 4 to the image layout apparatus 3, and stored in template file saving means 31 of the image layout apparatus 3.

The procedures in the image layout apparatus 3 for automatic insertion of the object images Obj are the same as in the first embodiment, and detailed description thereof will be omitted.

As has been described above, by setting the attributes in the template through extraction of the characteristics of the sample images, an electric photo album whose layout is similar to the layout of the image having the sample images can be generated automatically.

A third embodiment of the present invention will be described next. In the third embodiment will be described a method wherein changes in sizes of image areas and in a layout of object images as well as replacement of the object images are carried out according to preference or attractiveness in an image having the object images laid out by an image layout apparatus, and a template reflecting the changes and the replacement is generated. In the third embodiment, the same elements as in the first and second embodiments have the same reference codes, and detailed description thereof will be omitted.

Figure 14:
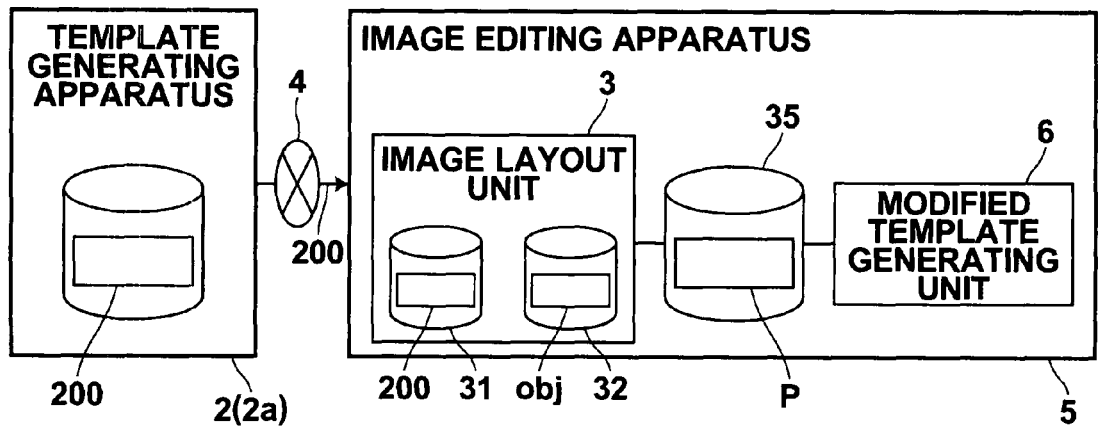
FIG. 14 shows the configuration of an image generation system of a third embodiment of the present invention.

As shown in FIG. 14, an image generation system 1b in this embodiment comprises a template generating apparatus 2 (2a), an image editing apparatus 5, and a network 4. The template generating apparatus 2 is placed in a design center or the like where a designer is working, and the image editing apparatus 5 is placed in a firm or the like for laying out images in a template and for changing the template.

As shown in FIG. 14, the image editing apparatus 5 comprises an image layout unit (an image layout apparatus) 3, layout image storage means 35 for storing an image P including object images Obj having been laid out in a layout area 201 by the image layout unit 3, and a modified template generating unit (a modified template generating apparatus) 6 for editing the image stored in the layout image storage means 35 and for generating a template corresponding to the modified image. The image editing apparatus 5 is realized by installation of an image layout program and a modified template generation program in a computer.

The template generating apparatus 2, the image layout apparatus 3, and the network 4 are the same as in the first and second embodiments described above, and detailed description thereof will be omitted. Only the configuration of the modified template generating unit 6 will be described below in detail.

Figure 15:
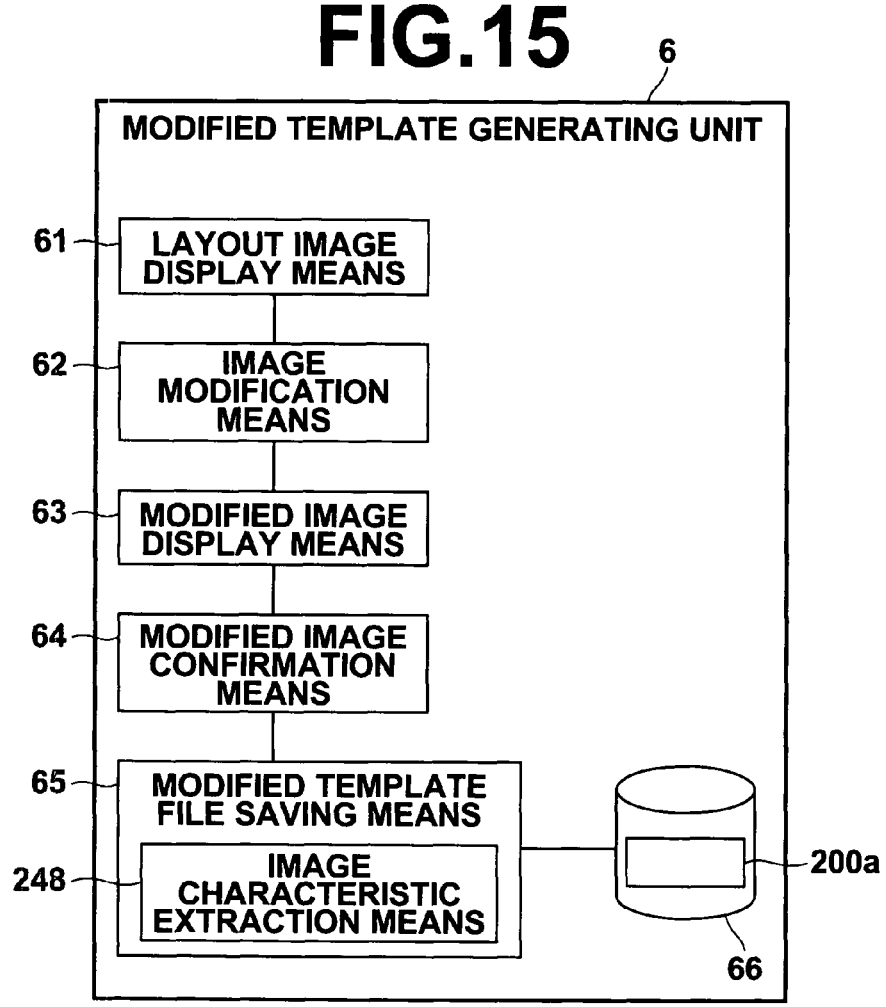
FIG. 15 shows the configuration of a modified template generating unit.

As shown in FIG. 15, the modified template generating unit 6 comprises layout image display means 61 for displaying the image P having the object images Obj laid out therein, image modification means 62 for carrying out modification of the image areas 202 in the layout area 201 and/or the object images Obj in the image areas 202, modified image display means 63 for displaying the modified image on a screen, modified image confirmation means 64 for confirming the modification in the displayed image, modified template file saving means 65 for saving a new template file 200a that has attribute information 203 of the modified object images Obj laid out in the image areas 202 by relating the information 203 to data of the corresponding image areas 202, and modified template file storage means 66 for storing the template file 200a saved by the modified template file saving means 65. The modified template file saving means 65 comprises image characteristic extraction means 248.

The layout image display means 61 displays on a screen the image P that is stored in the layout image storage means 35 and has the object images Obj laid out in the layout area 201.

Upon necessity, the image modification means 62 is used to replace the object images Obj in the image areas 202 in the layout area 201 displayed on the screen with other object images Obj and to change positions and sizes of the image areas 202. The image layout apparatus 3 lays out the object images having characteristics that are most appropriate for attribute information 203 related to the respective image areas 202 in a template file 200. However, in some cases, changes in the object images or the positions or the sizes of the image areas seem to be desired upon display of the image P. Therefore, the image layout apparatus 3 is used by an operator or the like for replacement of the object images Obj or for changes in the positions or the sizes of the image areas 202, in order to realize a layout having better composition.

The modified image display means 63 displays the layout modified by the image modification means 62 on the screen.

The modified image confirmation means 64 receives an input from an input device such as a mouse or a keyboard by the operator viewing the image displayed by the modified image display means 63 so that the operator can confirm the displayed image in the case where the layout of the object images and the sizes and the positions of the image areas 202 are satisfactory.

The modified template file saving means 65 stores the data of the image areas 202 in the layout confirmed by the modified image confirmation means 64 in the new template file 200a. The modified template file saving means 65 also extracts characteristics of the object images Obj in the layout areas 201 by use of the image characteristic extraction means 248, and generates the attribute information 203 based on the characteristics of the object images. The modified template file saving means 65 saves the attribute information 203 by relating the information to the data of the corresponding image areas 202 in the template file 200a.

The modified template file storage means 66 is a large-capacity storage device such as a hard disk, and stores the modified template file 200a.

Hereinafter will be described procedures wherein the object images Obj are laid out by the image layout unit 3 of the image editing apparatus 5 according to the template file generated by the template generating apparatus 2 and the image having the object images Obj is edited by the modified template generating unit 6 to generate the modified template corresponding to the edited image.

The template generating apparatus 2 or 2a in the first or second embodiment generates the template file 200, which is not described in detail here.

The template file 200 generated by the template generating apparatus 2 or 2a is sent to the image editing apparatus 5 via the network 4, and stored by template file storage means 31 of the image layout unit 3.

As has been described above according to the flow chart in FIG. 8 for the first embodiment, the image areas 202 are automatically filled with the object images Obj having the characteristics that are most similar to conditions set by the attribute information 203 in the template file 200 among the object images Obj stored in object image storage means 32 of the image layout unit 3. The image P having the object images Obj in the image areas 202 is stored in the layout image storage means 35.

Figure 16:
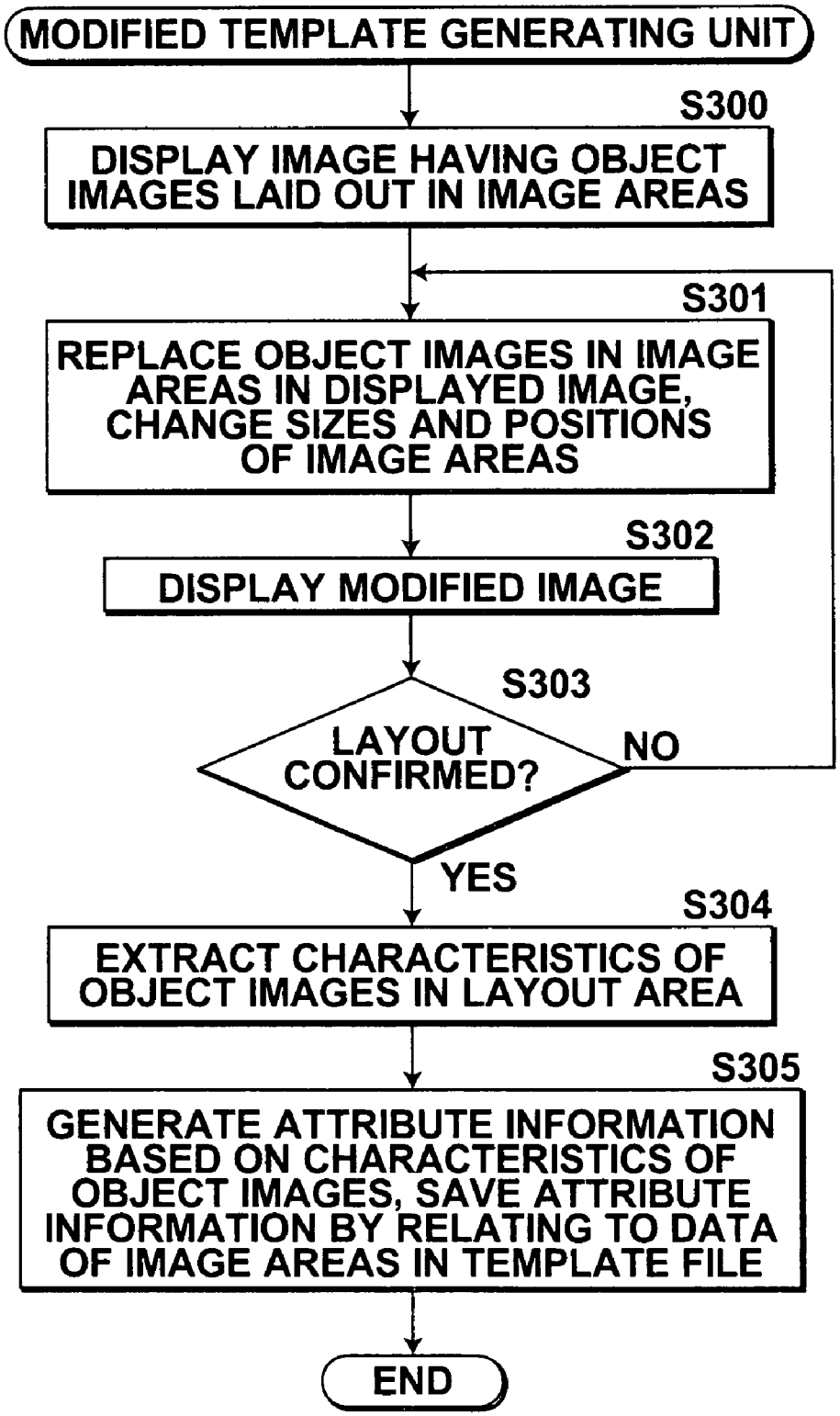
FIG. 16 is a flow chart showing procedures in the modified template generating unit.

Procedures for changing the automatically inserted images and for generating the template file corresponding to the modified image by use of the modified template generating unit 6 will be described next with reference to a flow chart in FIG. 16.

The layout image display means 61 of the modified template generating unit 6 displays the image P stored in the layout image storage means 35 and having the object images Obj laid out in the image areas 202 therein (S300). Upon display on the screen, the object images Obj may need to be replaced or the sizes or the positions of the image areas 202 may need to be changed. Therefore, the image modification means 62 replaces the object images Obj in the image areas 202 in the layout area 201 displayed on the screen with other ones of the object images Obj, and changes the sizes and the positions of the image areas 202 (S301). The modified image display means 63 displays the layout of the modified image on the screen (S302).

After confirming the image displayed on the screen, the operator or the like clicks a "Save" button or the like on the screen with a mouse or the like in the case where the layout of the object images and the sizes and the positions of the image areas are satisfactory, and the modified image confirmation means 64 receives the confirmation of the layout (S303).

After the confirmation, the modified template file saving means 65 saves the data of the image areas 202 in the template file 200a. The image characteristic extraction means 248 extracts the characteristics of the object images Obj laid out in the layout area 201 (S304). The modified template file saving means 65 generates the attribute information 203 based on the extracted characteristics of the object images Obj, and saves the information 203 in the template file 200a by relating the information to the data of the corresponding image areas 202. The template file storage means 66 stores the template file 200a (S305).

The modified template file saving means 65 described above stores the changed layout in the new template file. However, only the changes from the original file may be saved as a difference file.

As has been described above, the image having the automatically inserted images according to the attribute information set for the image areas in the template is edited, and the template is newly generated based on a result of the editing. In this manner, the template can be prepared for images of various scenes.

What is claimed is:

1. A template generating apparatus comprising:
    image area setting means for setting image areas in which images are laid out in a layout area of a predetermined size;
    template file saving means for saving information of the image areas laid out in the layout area in a template file;
    attribute information adding means for adding attribute information representing attributes of images to be laid out in the respective image areas to the information of the corresponding image areas in the template file, the attribute information including at least one of information regarding people who are photographed within images, information related to the compositions of images, information related to scenery photographed within images, and information related to photography conditions, wherein said attributes correspond to characteristics of said images such that an image having the characteristics that match or closely match the attribute information is automatically laid out within the corresponding image area; and
    an image layout apparatus comparing characteristics extracted from images to be laid out with attribute information of image areas when laying out images into image areas of a template, and laying out the image in the case that the characteristics of the image and the attribute information match or approximate each other.

2. The template generating apparatus according to claim 1 wherein the attribute information adding means comprises:
    image area display means for displaying the image areas set in the layout area on a screen;
    attribute information icon display means for displaying on the screen a plurality of attribute information icons used to add the attribute information representing the attributes of the images to be laid out in the respective image areas to the information of the corresponding image areas in the template file; and
    first attribute information saving means for saving the attribute information corresponding to any one of the displayed attribute information icons indicated by the operator via the input receiving means while a corresponding one of the displayed image areas is selected by the operator via the input means, by relating the attribute information to the information of the selected image area in the template file.

3. The template generating apparatus according to claim 2 wherein the attribute information represents a position and a size of a photographed person's face.

4. The template generating apparatus according to claim 2 wherein the attribute information represents image composition.

5. The template generating apparatus according to claim 4 wherein the attribute information represents the image composition by use of a vanishing point.

6. The template generating apparatus according to claim 2 wherein the attribute information represents a relationship between the images to be laid out in the respective image areas in the same layout area.

7. The template generating apparatus according to claim 1 wherein the attribute information adding means comprises:
    sample image storage means for storing sample images that can be laid out in the image areas in the layout area;
    sample image layout means for laying out any one of the sample images in each of the image areas in the layout area;
    sample-inserted image display means for displaying an image wherein the sample images have been laid out in the layout area;
    confirmation means for confirming the sample images laid out in the layout area as a layout of the displayed image;
    image characteristic extraction means for extracting characteristics of the respective sample images laid out in the confirmed image; and
    second attribute information saving means for saving the extracted characteristics of the respective sample images as the attribute information representing the attributes of the images to be laid out in the corresponding image areas in the layout area having the sample images, by relating the attribute information to the information of the corresponding image areas in the template file.

8. The template generating apparatus according to claim 7 wherein the attribute information represents a position and a size of a photographed person's face.

9. The template generating apparatus according to claim 7 wherein the attribute information represents image composition.

10. The template generating apparatus according to claim 9 wherein he attribute information represents the image composition by use of a vanishing point.

11. The template generating apparatus according to claim 7 wherein the attribute information represents a relationship between the images to be laid out in the respective image areas in the same layout area.

12. The template generating apparatus according to claim 1 wherein the attribute information represents a position and a size of a photographed person's face.

13. The template generating apparatus according to claim 1 wherein the attribute information represents image composition.

14. The template generating apparatus according to claim 13 wherein the attribute information represents the image composition by use of a vanishing point.

15. The template generating apparatus according to claim 1 wherein the attribute information represents a relationship between the images to be laid out in the respective image areas in the same layout area.

16. An image layout apparatus comprising:
    template file storage means for storing the template file generated by use of the template generating apparatus of claim 1;
    object image storage means for storing a plurality of object images that are laid out in the image areas in the layout area;
    characteristics extraction means for extracting characteristics of the object images; and
    image layout means for laying out in the image areas the object images in accordance with the attribute information added to the information of the image areas in the layout area of the template file, based on the extracted characteristics of the object images.

17. A modified template generating apparatus comprising:
    layout image display means for displaying an image having the object images laid out in the layout area according to the template file by use of the image layout apparatus of claim 16;
    image modification means for carrying out modification of the image areas and/or the object images laid out in the image areas in the layout area;

modified image display means for displaying on a screen the image having been modified;

modified image confirmation means for confirming the modification in the displayed image; and modified template file saving means for saving a template file having the information of the image areas corresponding to the modified image by adding the attribute information corresponding to the object images laid out in the image areas to the information of the image areas.

18. A computer readable medium having stored therein a program that causes a computer to function as:

layout image display means for displaying an image having the object images laid out in the layout area according to the template file by use of the image layout apparatus of claim 16;

image modification means for carrying out modification of the image areas and/or the object images laid out in the image areas in the layout area;

modified image display means for displaying on a screen the image having been modified;

modified image confirmation means for confirming the modification in the displayed image; and modified template file saving means for saving a template file having the information of the image areas corresponding to the modified image by adding the attribute information corresponding to the object images laid out in the image areas to the information of the image areas.

19. A computer readable medium having stored therein a program that causes a computer to function as:

characteristics extraction means for extracting characteristics of object images that are laid out in the image areas in the layout area and stored in object image storage means; and image layout means for laying out in the image areas the object images in accordance with the attribute information added to the information of the image areas in the layout area of the template file generated by use of the template generating apparatus of claim 1 and stored by template file storage means, based on the extracted characteristics of the object images.

20. The template generating apparatus according to claim 1 wherein said characteristics are extracted from the images by a characteristics extraction means.

21. The template generating apparatus according to claim 1, wherein the attribute information related to a person includes information regarding at least one of a size of the face, a center position of the face, face orientation, a position, a height, and a width of a rectangular shape surrounding a plurality of faces; attribute information related to composition includes information regarding at least one of a structural line and a position of a vanishing point; and attribute information related to scenery and photography condition includes information regarding photography of a sunset, photography at night, photography during the daytime, photography in daylight, photography with flash, and photography in backlit conditions.

22. The template generating apparatus according to claim 1, wherein the characteristics of images are extracted by analyzing the image using a characteristics extraction means, and wherein the characteristics extraction means employs a face detector to obtain information regarding the faces of people pictured in the images, employs an image classifier to obtain information related to the scenery or the photography conditions of the images, and/or obtains information related to the composition of the image based on lines extracted from the images.

23. A non-transitory computer readable medium having stored therein a program that causes a computer to function as:

image area setting means for setting image areas in which images are laid out in a layout area of a predetermined size;

template file saving means for saving information of the image areas laid out in the layout area in a template file;

attribute information adding means for adding attribute information representing attributes of images to be laid out in the respective image areas to the information of the corresponding image areas in the template file, the attribute information including at least one of information regarding people who are photographed within images, information related to the compositions of images, information related to scenery photographed within images, and information related to photography conditions, wherein said attributes correspond to characteristics of said images such that an image having the characteristics that match or closely match the attribute information is automatically laid out within the corresponding image area and an image layout apparatus for comparing characteristics extracted from images to be laid out with attribute information of image areas when laying out images into image areas of a template, and laying out the image in the case that the characteristics of the image and the attribute information match or approximate each other.

* * * * *